United States Patent
Lori et al.

(10) Patent No.: US 6,499,640 B2
(45) Date of Patent: Dec. 31, 2002

(54) APPARATUS AND PROCEDURE FOR THE DRAWING OF FILMS IN MOTION

(75) Inventors: Fabrizio Lori, Cerese DiVirgilio (IT); Graziano Bortoletto, Zero Branco (IT)

(73) Assignee: Nuova Pansac S.p.A., Milan (IT)

( * ) Notice: Subject to any disclaimer, the term of this patent is extended or adjusted under 35 U.S.C. 154(b) by 21 days.

(21) Appl. No.: 09/764,639

(22) Filed: Jan. 18, 2001

(65) Prior Publication Data

US 2001/0011666 A1 Aug. 9, 2001

(30) Foreign Application Priority Data

Jan. 24, 2000 (IT) .......................... MI00A0077

(51) Int. Cl.⁷ ........................ B65H 23/34; B65H 20/02; B65H 29/70
(52) U.S. Cl. ........................ 226/88; 226/190; 271/188
(58) Field of Search .......................... 226/88, 185, 190; 271/188, 272

(56) References Cited

U.S. PATENT DOCUMENTS

| | | | | |
|---|---|---|---|---|
| 3,280,717 A | * | 10/1966 | Bungay | 226/190 X |
| 3,282,486 A | * | 11/1966 | De Moss | 226/190 X |
| 3,529,757 A | * | 9/1970 | Sharpe | 226/88 |
| 4,076,890 A | * | 2/1978 | Yamada et al. | 428/337 |
| 4,094,451 A | * | 6/1978 | Wescoat | 226/88 X |
| 4,202,719 A | * | 5/1980 | Linn | 226/190 X |
| 4,294,414 A | * | 10/1981 | Gerstenberg | 271/188 X |
| 5,580,043 A | * | 12/1996 | Gelb, Jr. et al. | 271/272 X |
| 5,647,584 A | * | 7/1997 | Beaudreau et al. | 271/188 X |
| 5,727,724 A | * | 3/1998 | Dowling | 226/185 X |

* cited by examiner

Primary Examiner—Michael R. Mansen
Assistant Examiner—Minh-Chau Pham
(74) Attorney, Agent, or Firm—Notaro & Michalos P.C.

(57) ABSTRACT

An apparatus (1) for transversal drawing a film (2) in motion, has a pair of rollers (3, 4) rotating on parallel axes and fitted with toothed surface profiles (5, 6) that overlaps without touching each other. The profiles define a wavy passage (7) for the film, and rounded tips of the toothed profiles (5, 6) of the two rollers (3 and 4) define the points of application of the drawing action on the film (2).

8 Claims, 3 Drawing Sheets

APPARATUS AND PROCEDURE FOR THE DRAWING OF FILMS IN MOTION

FIELD AND BACKGROUND OF THE INVENTION

The object of this invention is an apparatus for the drawing of films in motion, at least in a direction perpendicular to the direction of motion of the film, also known as a Cross Direction Orientator.

The further object of this invention is a procedure for the drawing of films in motion, at least in a direction perpendicular to the direction of motion of the film.

For various applications, for instance in the hygienic article trade, there is an ever growing demand for transpiring plastic films.

The drawing of the film may be carried out in the direction of the forward motion of the film and/or in the direction perpendicular to the direction of the forward motion of the film.

Various types of apparatus are currently known, capable of performing the transversal or longitudinal drawing of a film in motion.

On the other hand, the known types of apparatus exhibit various drawbacks and a generally poor reliability, considerable encumbrance and high production cost.

SUMMARY OF THE INVENTION

The purpose of this invention is to offer an apparatus for the transversal drawing of film materials in motion, capable of eliminating at least part of the drawbacks provided by the devices of a known art.

BRIEF DESCRIPTION OF THE DRAWINGS

One possible embodiment of the drawing apparatus will now be described for purely exemplifying and non-limiting purposes, under reference to the attached drawings in which.

DESCRIPTION OF THE PREFERRED EMBODIMENTS

Figure 1:
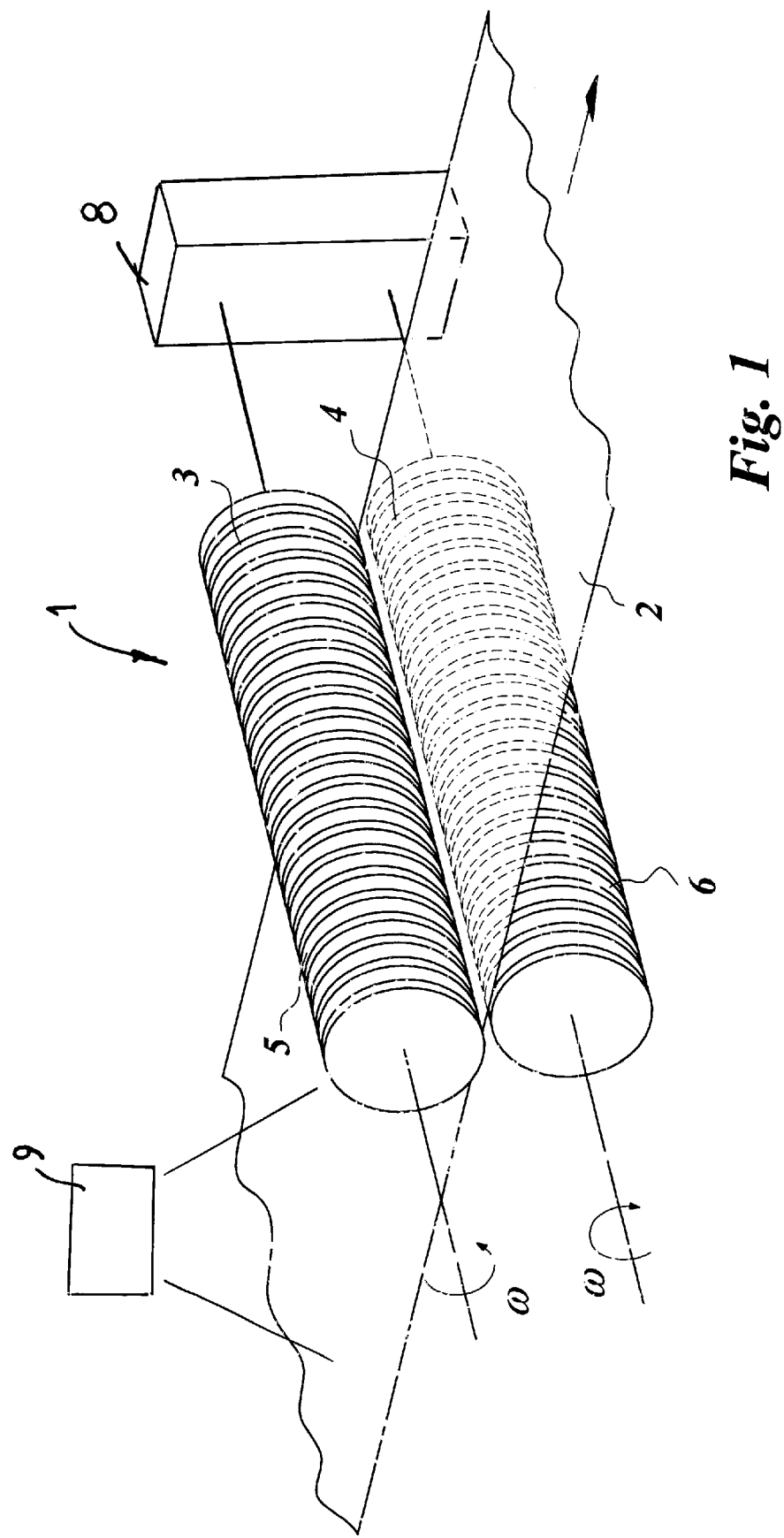
FIG. 1 is a simplified view of an apparatus in accordance with the statements in the claims.

With reference to the attached drawings, the number 1 indicates in the overall an apparatus for the drawing of the materials of film 2 in motion, which comprises a pair of rotating rollers 3 and 4, having parallel axes, with superficially toothed profiles 5 and 6 overlapping but not touching each other while outlining, in their overlapping area, a wavy passage 7 through which the film is passed.

Figure 2:
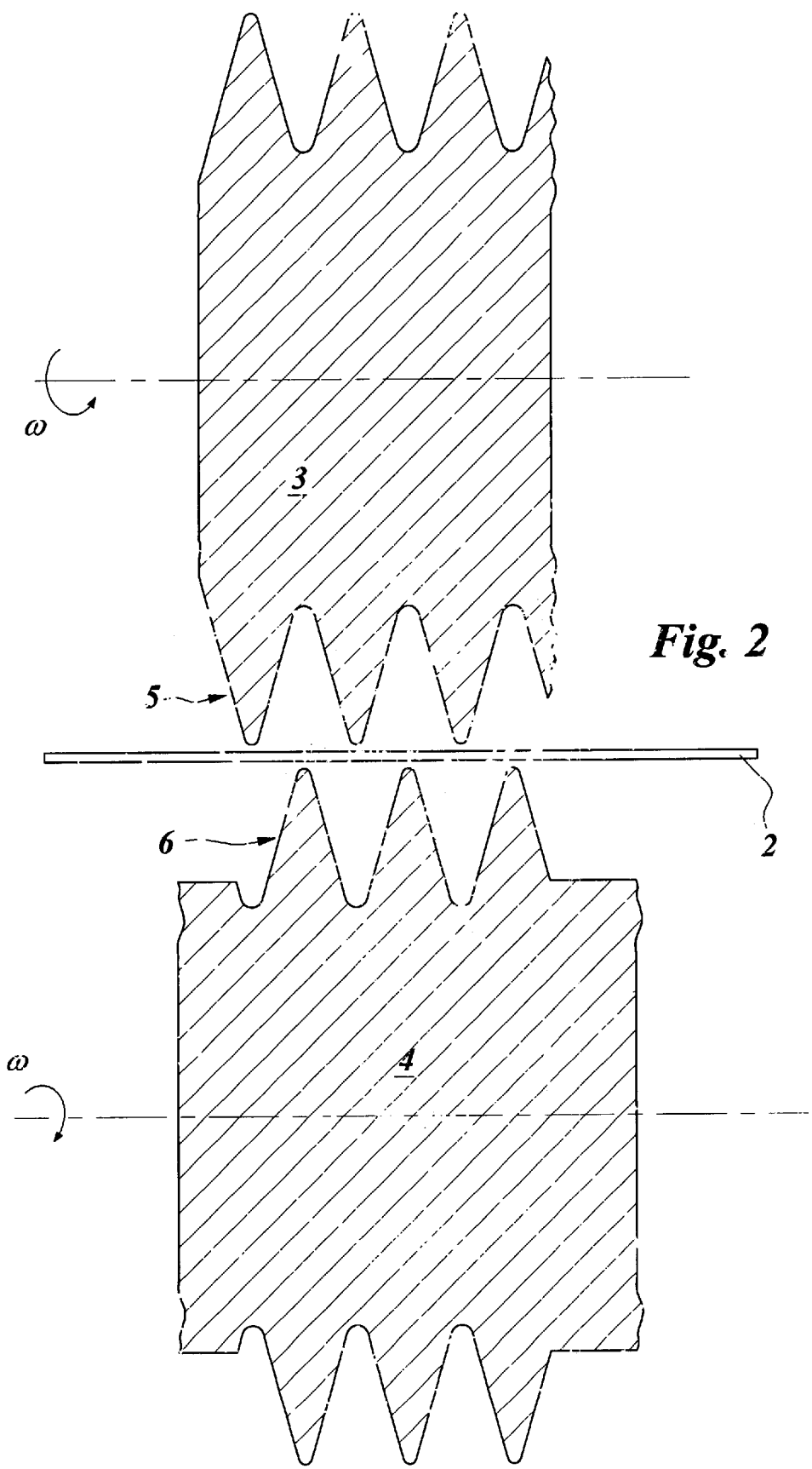
FIG. 2 is an enlarged detailed of the apparatus, showing a film material before entering into the passage between the transversal drawing rollers.
Figure 3:
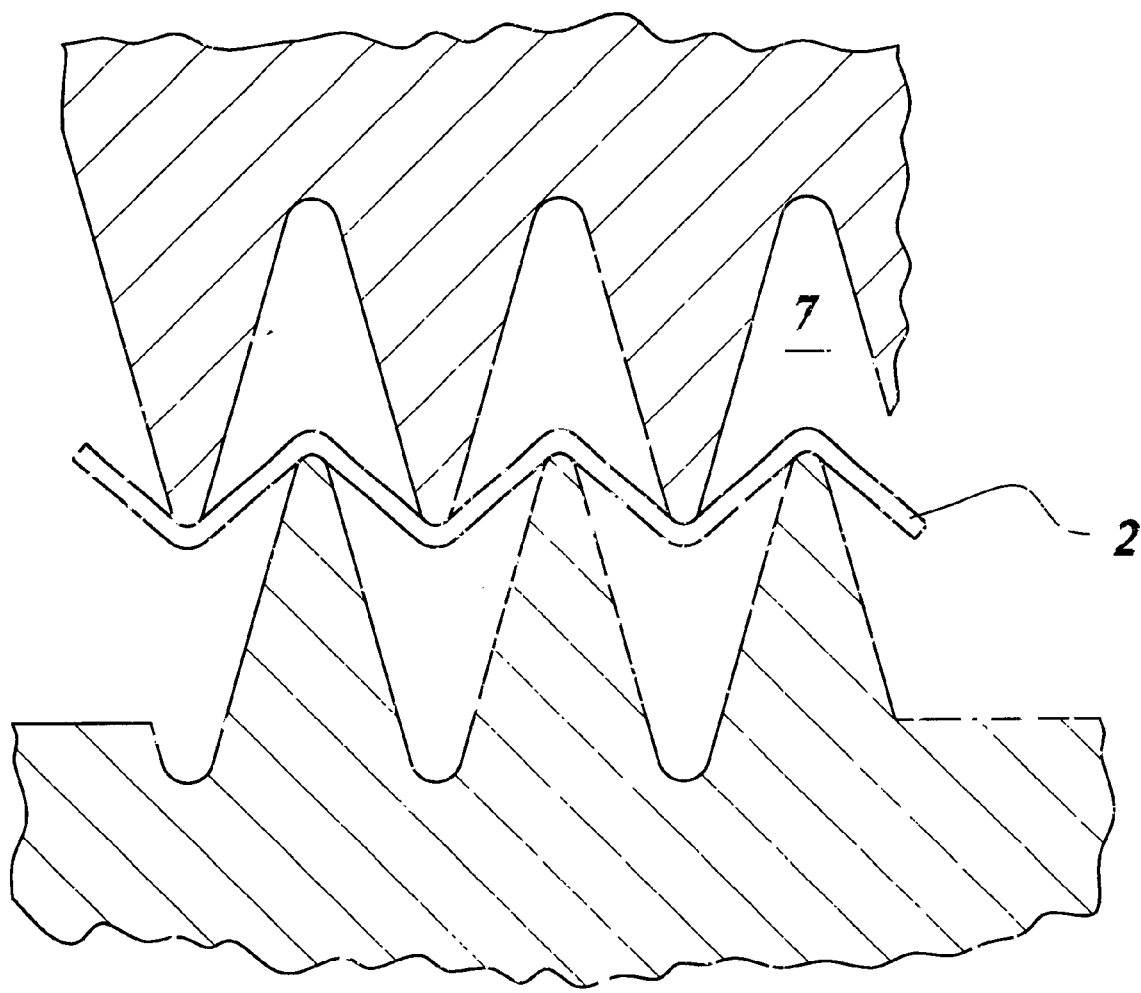
FIG. 3 is a view of the same enlarged detail that shows the film material while entering the passage between the two drawing rollers and in the process of drawing.

When entering this wavy passage 7, the film comes in contact with the single rounded ends or apexes of the toothed or triangular profiles 5 and 6 and of the rollers 3 and 4—which define the applicative points of a progressive transversal drawing motion with respect to the direction of forward motion of film 2 (refer to FIG. 2).

The rollers 3 and 4 are rotating in direction w and in the same direction of forward motion of the film 2, preferably at a speed slightly higher than that of the film itself, so as to keep the film in a slight tension. Means for rotating the rollers is schematically shown at box 8.

The rollers 3 and/or 4 will also preferably be fitted with devices capable of regulating the surface temperature of the profiles 5 and 6, so as to facilitate the drawing action. Box 8 schematically illustrates such a device as well.

Alternatively it will be possible to provide the use of devices 9 designed to heat the film before contacting the toothed profiles 5 and 6.

Such devices are known to an expert in the trade, and are therefore not to be described further.

While using the drawing apparatus on some polyolefin films the surface temperature may attain about 80° C., depending on the composition of the material, its speed and the desired drawing ratio. Heating to a temperature of 20 to 80° C. is also possible or 20 to 300° C.

The shape and size of the teeth may vary depending on the desired drawing ratio.

It is obviously important that the toothed profiles 5 and 6 be smooth and thus do not present irregularities or sharp edges, which would cause the film itself to tear.

What is claimed is:

1. An apparatus (1) for transversal drawing of a film (2) in motion, comprising a pair of rollers (3, 4) rotating on parallel axes, fitted with toothed surface profiles (5, 6) each having a single apex and being capable of overlapping without touching each other and defining a wavy passage (7) for the film, where each apex is rounded and defines points of application of drawing action on the film (2).

2. An apparatus according to claim 1, including means capable of regulating an angular speed of said rotating rollers (3, 4).

3. An apparatus according to claim 2, including means so that a surface temperature of said rotating rollers (3, 4) is adjustable between 20 and 80° C.

4. An apparatus according to claim 2, also comprising means to heat the film (2), within a temperature between 20 and 80° C., before it comes in contact with the toothed profiles (5, 6).

5. A procedure for drawing a polyolefin film in motion, comprising a phase of passing the film across a wavy passage (7) formed by a plurality of overlapping, out of contact profiles each with a single rounded apex, the film moving in a transversal sense (2) with respect to a direction of forward motion of the film (2), so as to subject the film to a multiple number of transverse stretching actions, distributed over its entire width.

6. An apparatus according to claim 5, where said wavy passage is formed by two rotating rollers (3, 4) equipped with the profiles.

7. An apparatus according to claim 6, including rotating the rollers (3, 4) at a peripheral velocity exceeding that of the film (2).

8. A procedure according to claim 5, wherein the film is heated to a temperature held between 20 and 300° C.

* * * * *